United States Patent [19]

Fitzgerald et al.

[11] Patent Number: 4,901,252

[45] Date of Patent: Feb. 13, 1990

[54] METHOD FOR PRODUCING PLANAR GEOMETRIC PROJECTION IMAGES

[75] Inventors: William J. Fitzgerald, Ridgefield, Conn.; Franklin Gracer, Yorktown Heights; Robert N. Wolfe, Peekskill, both of N.Y.

[73] Assignee: International Business Machines Corporation, Armonk, N.Y.

[21] Appl. No.: 100,686

[22] Filed: Sep. 24, 1987

Related U.S. Application Data

[63] Continuation of Ser. No. 630,627, Jul. 13, 1984, abandoned.

[51] Int. Cl.$^4$ .............................................. G06F 15/62
[52] U.S. Cl. .................................... 364/522; 364/518; 340/729
[58] Field of Search ................ 364/518, 522; 340/723, 340/725, 729, 747; 358/96, 183

[56] References Cited

U.S. PATENT DOCUMENTS

| | | | |
|---|---|---|---|
| 3,621,214 | 11/1971 | Romney | 364/522 |
| 3,816,726 | 6/1974 | Sutherland et al. | 364/518 |
| 3,889,107 | 6/1975 | Sutherland | 364/518 |
| 3,961,133 | 6/1976 | Bennett | 358/183 |
| 4,117,512 | 9/1978 | Miyake et al. | 358/183 |
| 4,156,237 | 5/1979 | Okada et al. | 340/701 |
| 4,209,832 | 1/1980 | Gilham et al. | 364/423 |
| 4,317,114 | 2/1982 | Walker | 340/721 |
| 4,586,038 | 4/1986 | Sims et al. | 340/725 X |
| 4,594,673 | 6/1986 | Holly | 364/522 |
| 4,736,200 | 4/1988 | Oununma | 340/723 X |

OTHER PUBLICATIONS

A. Appel, "The Notion of Quantitative Invisibility and the Machine Rendering of Solids", Proc. ACM. Nat'l. Conf., 1967 (QA76A8), pp. 387–393.

Sutherland et al., "A Characterization of Ten Hidden–Surface Algorithms", ACM Computing Surveys, Mar. 1974.

Fuchs et al., "On Visible Surface Generation by a Priori Tree Structure", Computer Graphics No. 14(3), Jul. 1980, SIGGRAPH 80.

Fuchs et al., "Pixel-Planes: A VLSI-Oriented Design for a Raster Graphics Engine", VLSI Design, Third Quarter 1981, pp. 20-28.

Hubschman et al., "Frame-to-Frame Coherence and the Hidden Surface Computation:", Computer Graphics, vol. 15, No. 3, Aug. 1981, pp. 45-54.

Primary Examiner—Parshotam S. Lall
Assistant Examiner—Joseph L. Dixon
Attorney, Agent, or Firm—Jack M. Arnold

[57] ABSTRACT

The lines representing each edge of each face of each object of a model for producing a multiple object image are segmented at line of sight intersections with other lines representing contour edges of visible faces. Each resulting edge line segment is checked against all visible faces to determine which are visible and which are invisible, and information on visibility is stored together with detailed information on each edge line segment for each object. The model is modified by changing the number of component objects and after each change checking the edge line segments for visibility only with respect to the changes associated with the changed component objects. This results in a substantial reduction in the required number of comparisons between segments and faces as compared to prior methods.

15 Claims, 13 Drawing Sheets

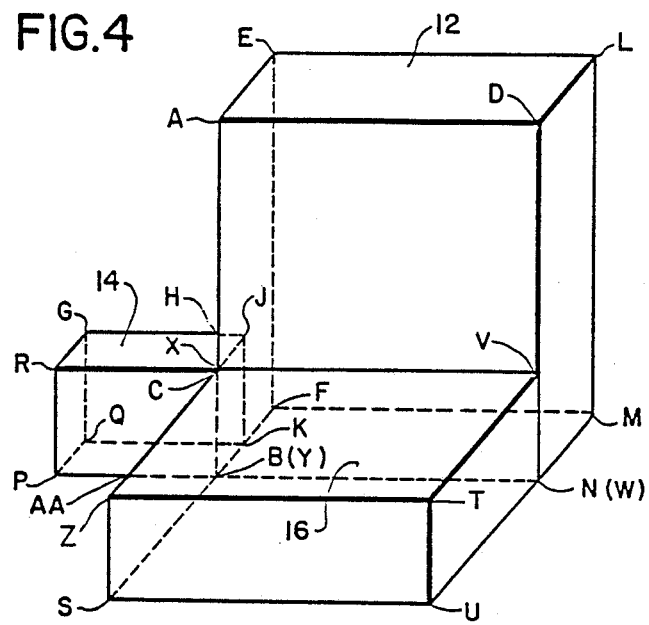
FIG.4
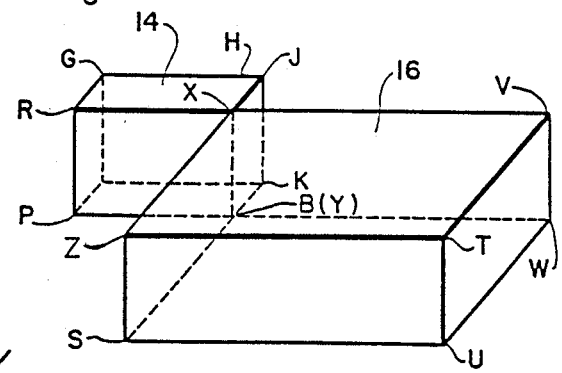
FIG.5
FIG.6
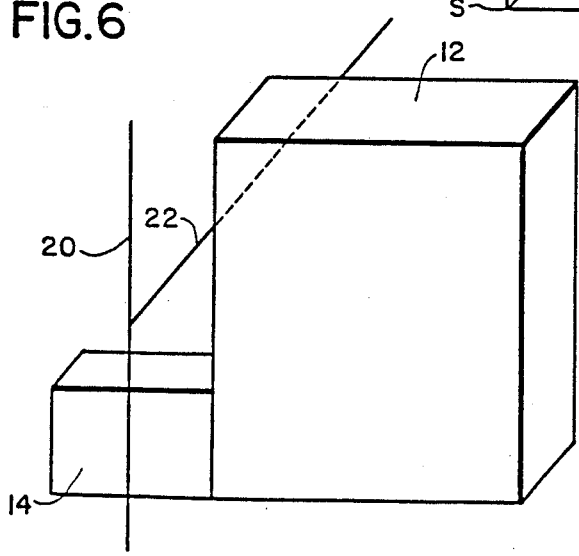

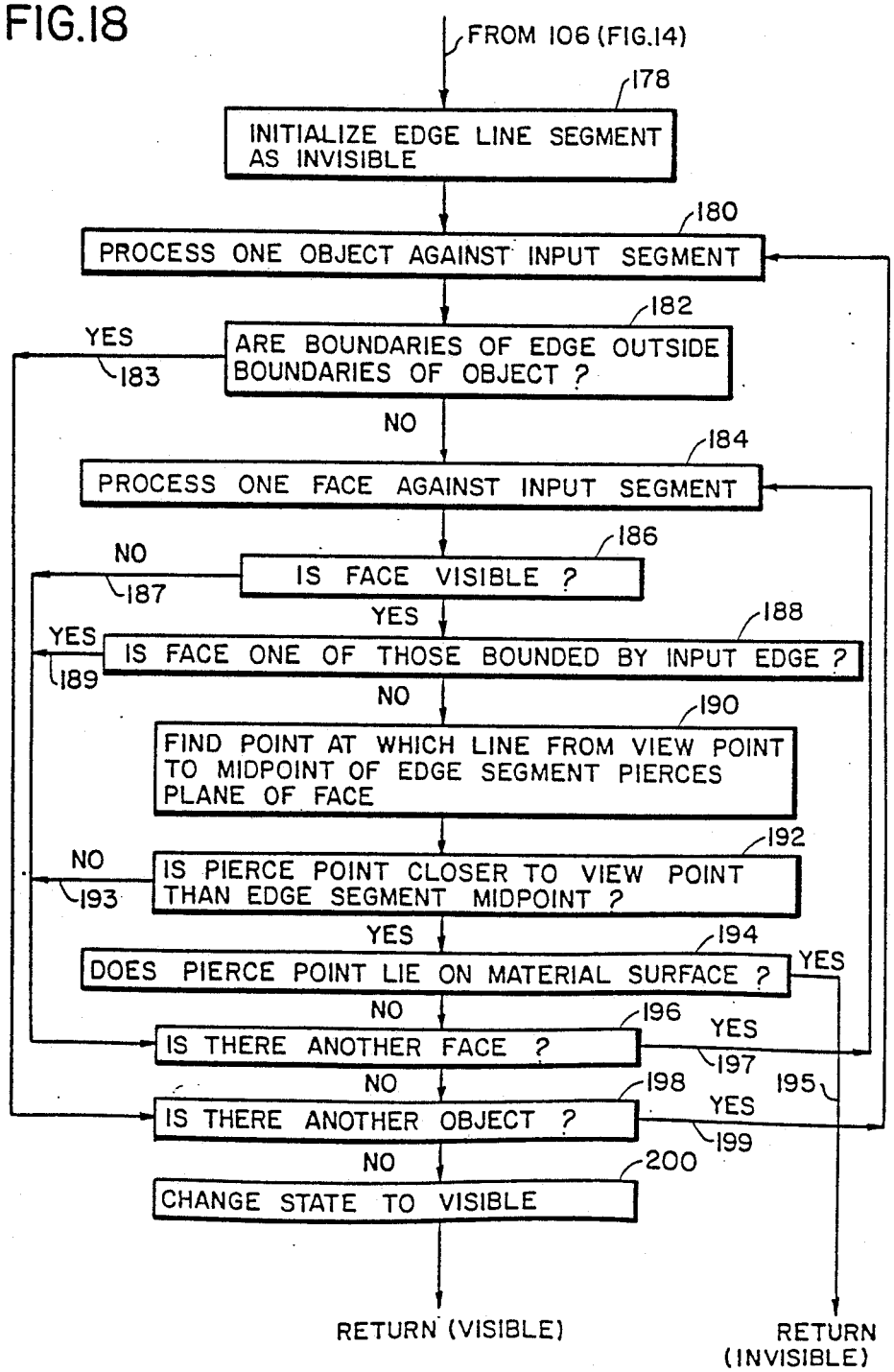

METHOD FOR PRODUCING PLANAR GEOMETRIC PROJECTION IMAGES

This application is a continuation of application Ser. No. 06/630,627, filed on July 13, 1984 now abandoned.

TECHNICAL FIELD

The present invention relates to the production of a projected image from a computer model of a solid article or assembly which simulates what the eye would see if looking at a real article from a selected vantage point (referred to below as the "view point" or "eye point"). The invention particularly relates to the production of a planar geometric projection of an article, or assembly, in which lines represent boundaries of faces of the article, or assembly, and in which any such lines which are hidden from view are either removed from the image entirely, or are differentiated by being shown as dashed or dotted, as is conventional in mechanical drawings. For detailed background material in this field, attention is directed to the book entitled "Fundamentals of Interactive Computer Graphics" by Foley and Van Dam, published by Addison-Wesley Publishing Company of Reading, Mass., U.S.A., in 1982.

As used in this specification, the lines which are hidden may be often referred to as "invisible". The terms "hidden" and "invisible" are used interchangeably. However, it will be understood that the hidden or "invisible" lines may be completely removed from the image, or may be shown as dashed or dotted, as desired.

Computer graphics, and computerized drafting machines and programs have been demonstrated to be extremely useful. When planar geometric projections of solid articles or assemblies are produced on a computer, they are often represented without the hidden lines being removed or distinguished in any way. These images are sometimes referred to as wire frame images, since the edges are all visible as they would be in an article, or assembly, produced from an open lattice work of wires. However, images from which the hidden lines are removed, or distinguished in other ways, are much easier to interpret, and are much more useful for many purposes. Accordingly, it is highly advantageous to produce images in which the hidden lines are clearly distinguishable from the visible lines.

The articles or assemblies to be displayed, and to which this invention particularly relates, are compound articles or assemblies composed of a plurality of objects which may or may not be interconnected into a unitary structure. The term "object" is just used below to refer to component objects of the article or assembly to be displayed.

PRIOR ART

In the proceedings of the Association for Computing Machinery National Meeting of 1967, beginning at page 387, there is a technical paper entitled "The Notion of Quantitative Invisibility and the Machine Rendering of Solids" by Arthur Appel of International Business Machines Corporation, Yorktown Heights, N.Y. which describes programs for developing planar geometric projections of solid articles within a computer. The address for the Association for Computing Machinery is 1133 Avenue of the Americas, New York, N.Y. 10036.

That paper deals with the problem of removing hidden lines for greater clarity. That paper presents a method for the determination of visibility of lines in a line drawing to determine which lines should be deleted from the image. As explained in that paper, which is incorporated by reference herein, there are two basic procedures required in order to determine visibility of a line segment. Thus, when a line formed by an object face boundary passes behind an object contour line, that fact must be determined. Then, a determination must be made as to whether the line is going behind, or coming from behind the visible surface of which the contour line is a boundary. Each edge line of the model is partitioned into segments at points where that line crosses another line which is a contour line of an object image. Each segment is determined to be either entirely visible or entirely hidden. The visible segments are displayed as solid lines, and hidden segments are not shown, or displayed as dashed.

To determine if a segment is visible, it is compared with all visible faces of the model, and if the segment is behind any such face, it is determined to be hidden.

Every edge line segment of the model must be compared with every visible face of the model in order to determine visibility. Thus, the number of comparisons is essentially the product of the number of line segments and the number of visible faces. In creating a complex three-dimensional model having the desired appearance and characteristics, it is common to proceed in steps to add or remove component objects within the model. Thus, the model often consists of a plurality of component objects which are arranged together, with some such component objects being in the foreground, and others in the background, when seen from a particular view point. From this point on, the term "object" is generally used to refer to a component object.

In the prior system of Appel, when the images of models are typically created in a sequence of iterations by adding or removing individual object representations from the total model in order to build up the model, or to change or modify the model, any such changes of this kind are accommodated only by completely repeating the procedure of comparing every edge line segment with every visible face to redetermine visibility of edge line segments. Furthermore, where an edge line segment has been determined to be invisible, no record of the invisible status is stored for future use in subsequent iterations. Thus, the status must be re-tested in each subsequent iteration. The computer time required in carrying out this method can be prohibitive, especially for complex objects.

SUMMARY OF THE INVENTION

Accordingly, it is an important object of the present invention to provide an improved method in which changes in the number of objects represented in a planar geometric projection can be accomplished expeditiously, and in which the visibility of the edge line segments can be quickly and more efficiently determined after a change in the number of objects in the model.

Further objects and advantages of the invention will be apparent from following description and the accompanying drawings.

In carrying out the invention there is provided an improved method for changing a planar geometrical projection image of a compound physical structure which is comprised of a plurality of component objects having separate boundary faces, the method comprising separately storing information for each object on each segment of each edge line formed by an object face edge, edge lines being segmented at line of sight intersections with other lines representing contour edges of visible faces, checking each edge line segment against all visible faces to be represented in the image to determine which edge line segments are visible and which are invisible, including information on visibility with the information stored for each edge line segment, and then modifying the image by changing the number of component objects and after each change in number of objects checking edge line segments for visibility only with respect to the changes associated with the changed objects.

BRIEF DESCRIPTION OF THE DRAWINGS

FIG. 4 shows how the object of FIG. 3 is combined with the model of FIG. 2 to produce a new and enhanced image.

FIG. 5 illustrates how an object may be removed from the model, and how the remaining objects are affected by that removal.

FIG. 6 illustrates a model image in which a string object is partially hidden by a solid object.

FIG. 18 is a flow chart illustrating another sub-routine of the method of the invention for determining the visibility or invisibility of line segments and bearing the name QINVIS.

DETAILED DESCRIPTION OF THE PREFERRED EMBODIMENTS OF THE INVENTION

The present invention is an improvement in the methods embodied in the aforementioned Appel programs.

The invention may be practiced on any properly programmed general purpose computer, for example, the IBM 7094 as set forth in the Appel article.

Figure 1:
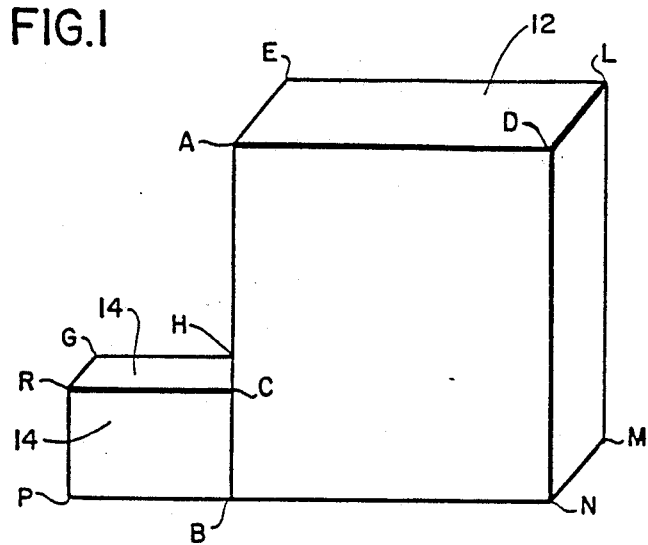
FIG. 1 is an image of a simple model of the type dealt with in the present invention, and in which the hidden lines are omitted.

Referring more particularly to FIG. 1, for purposes of comparison and explanation there is illustrated a planar geometric projection image of a simple combination of objects 12 and 14, which may be unitary in nature, but in which lines formed by boundaries of object faces which are invisible or hidden have been omitted altogether. The ends and intersections of the segments of some of the lines representing boundaries of object faces in FIG. 1 have been labeled with letters A, B, C, D, G, H, L, M, N, P, Q and R for ease of explanation, and in order to better relate FIG. 1 to FIG. 2.

Figure 2:
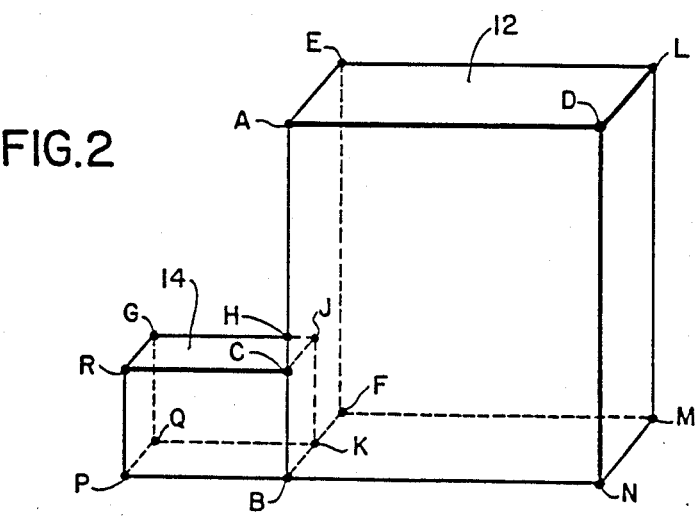
FIG. 2 is another image of the same model as FIG. 1 in which the hidden lines are shown in dashed form to reveal the hidden structural features.

FIG. 2 shows the model of FIG. 1, but with the invisible, of hidden edge line segments shown dashed, and with hidden edge line segment ends and intersections labeled with letters J, K, and F. In FIG. 2, the hidden edge line segments have been further define by lettering at the ends and at the intersections of those edge line segments with other edge line segments. In FIG. 2, all of the lines are either fully sible, of completely invisible, except for line GJ, which has the visible segment GH, and the invisible segment HJ. The terms "hidden" and "invisible" have been used interchangeably in this specification to refer to hidden or invisible edge lines, and are intended to have the same meaning.

The term "edge" as used in this specification refers to the boundary edge of a face, rather than to the edge of an object. Since faces may meet at an inside concave face intersection of an object, the line where those faces meet is referred to as an "edge", just as in an outside (convex) face intersection.

The invention especially relates to the presentation of line drawings, where lines represent the edges of faces, of facets, of the objects in the model which is represented. Accordingly, the terms "line" and "edge" are often used interchangeably in this specification to refer to an "edge line". Furthermore, those terms are sometimes used to refer to a segment of an edge line.

Referring again to FIG. 2, in accordance with the invention, all of the hidden lines and line segments, sometimes herein referred to generically as "line segments" are stored and retained in memory in three-dimensional notation, together with the information that the segments are hidden, or invisible. Similarly, all of the visible lines are stored in three-dimensional notation, together with the information that they are visible. Each segment is stored as a separate "edge line" in an "edge list". The objects, as defined by the edge lines, are sometimes referred to below as "wire objects" since the edge lines appear to be equivalent to wires. In an actual display, the hidden lines may be displayed as dashed lines, as in FIG. 2, or they may not be shown, as in FIG. 1. But even when not shown, the hidden lines are stored.

In accordance with an important feature of the present invention, after the visibility or invisibility of particular line segments has been determined, consecutive visible segments along an edge line are combined and stored as one visible edge segment, and consecutive invisible segments are also combined and stored as one invisible edge segment. This serves to reduce the number of comparisons required in the steps described in the following paragraphs.

Figure 3:
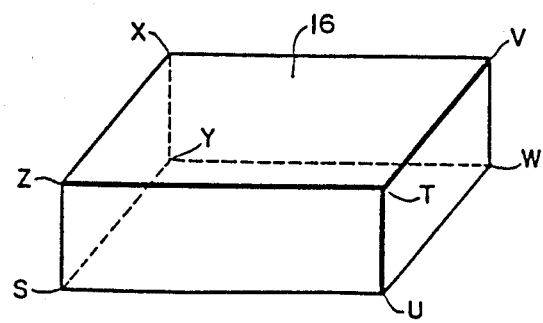
FIG. 3 is a view corresponding to FIG. 2, and illustrating an image of another object which is to be added to the model of FIG. 2, and in which the hidden lines are shown dashed.

If a new object, such as object 16 illustrated in FIG. 3, is to be added to the model of FIG. 2, the following steps, in accordance with the present method, are undertaken:

A. A hidden line detection process is carried out on the new object 16, based only upon its own visible surfaces, the surfaces respectively defined by the letters ZTVX, ZTUS, and TUWV. This comparison results in the determination that the lines XY, YW, and YS are invisible.

B. The new object 16 of FIG. 3 is then added to the model of FIG. 2 to form the combined model of FIG. 4. However, in the course of accomplishing this combination, the visible edge line segments of the new object 16 are checked against the original faces of the original model of FIG. 2 to determine whether any of the new edge line segments are hidden by the faces of the original object. Only the edge line segments determined to be visible in step A are compared with the visible faces of the original model of FIG. 2 since the other edge line segments are already hidden. In this instance, since the new object 16 is placed in front of the objects of the old model of FIG. 2, none of the visible edges of the new object are hidden by faces of the objects in the original model.

C. Next, the visible edge line segments of the objects in the original model are checked against the visible faces of the new object 16 to determine which, if any, of the previously visible line segments are now hidden. In the present example, the previously visible line segments BN and BC are hidden by the new object, and thus become invisible. Similarly, a portion of the line BP identified as FIG. 4 as B-AA is hidden by the new object. The point B of the original object of FIG. 2 which is common to the point Y of the added object 16 of FIG. 3 is identified in FIG. 4, with both letters, Y being in parentheses. The same convention is used for point N(W).

In accordance with the prior method of Appel, it would be necessary to check the entire changed model for hidden lines. This would mean checking 67 line segments against 9 visible faces so that 603 comparisons are required (the product of 67 times 9). However, with the improved method of the present invention, only 16 line segments need be compared with 3 visible faces in step A (48 comparisons), only 9 visible edge segments need be compared with 6 visible faces in step B (54 comparisons), and only 14 visible edge segments of the original model need be compared with 3 visible faces of the new object in step C (42 comparisons) to make a total of 44 comparisons. Thus, for all three steps, the number of comparisons is only 144, a substantial reduction to only 24 percent of the number of comparisons necessary in the Appel process.

This improvement is achieved because the new method makes it unnecessary to check the edge line segments of the objects in the old model against their own visible faces simply to add a new object. Furthermore, it is not necessary to check the hidden edge segments of the old model against the visible faces of the new added object since they remain hidden. Also it is not necessary, in the new method, to check the hidden edge line segments of the new object against the visible faces of the old model, since they are already hidden by the visible faces of the new object.

This reduction is substantially greater when the original model is of greater complexity.

It is one of the important features and advantages of the invention that comparisons performed for any model will not have to be repeated for subsequent changed models, where the change involves the addition of one or more new objects. The difference in the number of comparisons is far greater if the original model is complex compared with the object which is added to the model. This is often the case as the generation of a new design progresses. The reduction is essentially a direct function of the ratio between the complexity of the original model and the complexity of the object or objects which are added. Since some models can be quite complex, the number of steps can be reduced phenomenally in some instances.

In one known example of a model to be displayed on a computer using techniques similar to those described in this specification, there are about 30,000 edges and 6,000 faces. Assume that the total number of visible edge line segments is about equal to the total number of edges, and that the total number of hidden segments is about equal to the total number of edges, and that the total number of visible faces is about 50% of the total number of faces (all in conformity with the ratios present in the model of FIG. 4). Then to determine hidden line status initially, of upon adding other objects according to the prior method, the total number of segments which must be compared with faces is the sum of the total visible segments and the total hidden segments (60,000). These edges must be compared with the total number of visible faces (3,000). Thus, the total number of comparisons required will be about 180,000,000. This is essentially the number of comparisons required if the model illustrated in FIG. 4 is to be added to the complex model having 30,000 edges.

If the model of FIG. 4 is added to the complex model in the new method of the present invention, the computations are as follows: The number of comparisons in step A is $67 \times 9 = 603$. In step B, only 22 new visible segments need be compared with 3,000 visible faces of the complex model because the number of visible segments is reduced by the combination of adjacent visible segments. The total comparisons in step B is therefore 66,000. In step C, the visible segments of the complex model are reduced by combining adjacent visible segments to about 18,000 from 30,000, and these must be compared with the nine faces of the FIG. 4 model objects for a total of 162,000 comparisons. This makes a total of only 228,603 comparisons.

This represents a phenomenal reduction to a number of comparisons which is a fraction of only 1/789the of the previous number of comparisons. Stated another way, as a percentage, the new number of comparisons represents only in the order of 1/10 of 1% of the prior comparisons (more exactly 0.127%).

Perhaps it is more meaningful to express the reduction in comparison operations in terms of the amount of operating time required on a large mainframe computer. For instance, with the complex model having 30,000 edges, the hidden line processing time, with 180,000,000 comparisons is typically over one hour. Assuming that the task could be accomplished in one hour, by the present improvement method, the time is reduced to about 4.5 seconds. This makes the hidden line processing achievable and practical on a "real time" basis for the generation of drawings.

With models of lesser complexity, the reduction in the number of comparisons is not as great, but the total number of comparisons is less, and accordingly the processing time is even less.

As an example of a model of considerably lesser complexity, and having only 1,000 edges and using the same reasoning as given above, the total number of comparisons required under the old method is about 160,000, and the total number of comparisons employing the improved method of the present invention is 7,760, which means that the number of comparisons has been reduced to about 5% of the previous total.

Thus, the reductions in the number if comparisons, and the savings in operating time achievable in accordance with the present invention are extremely impressive, and very valuable in terms of the savings in the cost of machine operating time and added convenience to the user in providing "real time" interaction with the computer.

The total number of comparisons required in the old method and the new method are further reduced by excluding comparisons where the edges and faces to be compared are in totally different parts of the projection image. This is done by providing projection "boxes" defining the outlines of both edges and faces determining when those boxes do not overlap, as described more fully below. The effect of this "boxing" technique has not been considered in the above computations. The improvements provided by the present invention are not quite as great, if the effect of the "boxing" technique is considered.

In accordance with the present invention, information relating to the edge line segments of each object of the model is separately stored as unique to that object. Thus, if an object is removed from the model, the operations required in conjunction with that removal are greatly simplified. The following steps are followed when the change in the number of objects consists of a reduction in the number of objects by removal of an object:

A. All of the visible and invisible edge line segments relating to the removed object are cancelled and discarded.

B. All of the invisible segments of the remaining objects are checked against all of the visible faces of the remaining objects to see which of those edge line segments become visible.

By checking only the invisible edge line segments, a substantial saving in the number of comparisons required is made. For instance, if object 12 is removed from FIG. 4 to form FIG. 5, there are only 6 remaining visible faces, and only 10 invisible line segments to be cross checked giving a total of 60 comparisons. The method as disclosed by Appel requires that all segments be checked against visible faces, meaning that 39 edge line segments must be compared against 6 visible faces, requiring a total of 234 comparisons.

In the preferred form of the present invention, the number of comparisons is further reduced by limiting the comparisons to invisible line segments which occur within the orthogonal two dimensional projection box of the removed object. Thus, the two dimensional projection box of object 12 is outlined by the letters A, B, N, M, L, E, A. By limiting the comparisons to that projection, all of the previously hidden line segments, which now become visible, are detected, and the number of line segments compared with visible fces is further drastically reduced.

The techniques of the present invention are not necessarily limited to representations of solid objects. So-called "string" objects, such as wire harnesses, which can be represented by single lines can also be dealt with in conjunction with solid objects. For instance, in FIG. 6, a string object represented by two interconnected lines 20 and 22 is shown in conjunction with solid objects 12 and 14 of FIG. 2. As indicated in that figure, part of the line 22 is concealed behind two of the visible faces of the solid object 12.

Figure 7:
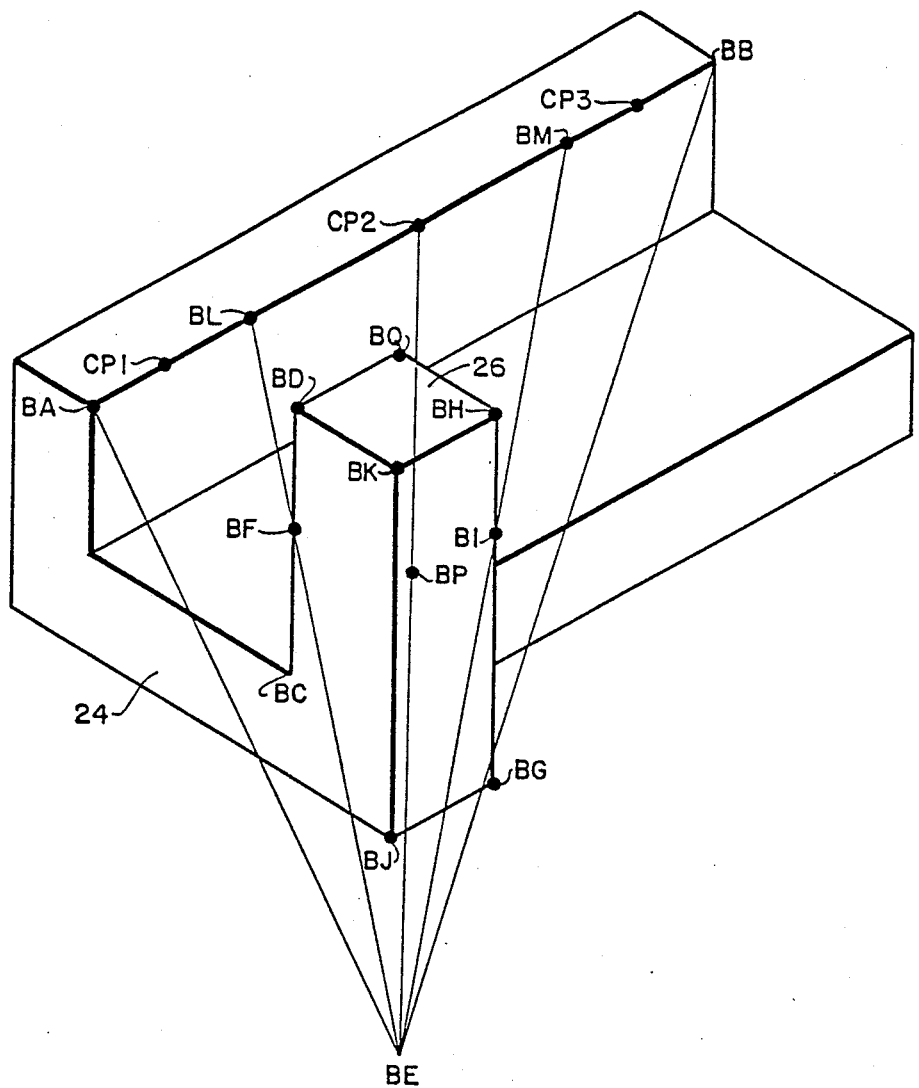
FIG. 7 is a planar geometric projection of an object, including lettered construction lines and points, and an eye point, to illustrate various steps of the method of the invention.

FIG. 7 illustrates operations preferred in carrying out the method of the present invention. In FIG. 7 there is shown an "L" shaped object 24, with a vertical column 26 appearing in the foreground. The following discussion relates to the determination of the visibility of various segments of an edge line BA-BB of the L shaped section 24, when viewed from an eye point BE, which is in the same horizontal plane as the upper surface of the object 24 containing the edge BA-BB. The vertical column object 26 in the foreground extends above that plane.

The edge line BA-BB may be said to have associated therewith a sweep plane defined by BA-BB and the eye point BE. Then the edge BC-BD of the vertical column object 26 intersects that sweep plane at BF, and the vector BE-BF, representing a line of sight from the eye point BE to BF projects onto the edge line BA-BB at BL. This is a point where the edge line BA-BB changes visibility. Similarly, the vertical edge BG-BH of the vertical column 26 intersects the plane at BI, which projects to a point BM on the line BA-BB. This is another point where visibility changes. Edge BJ-BK is not tested, because it is not a "contour edge" and therefore cannot effect visibility. A contour edge is an edge formed between a visible face and an invisible face.

The visibility of a face is determined by examining stored information as to the direction of a line normal to each face. If the normal of that face extends towards the eye point BE, it is visible, and if away from the eye point, it is invisible. The fourth vertical edge of the column, ending at point BQ, is not tested, because it is not on a visible face. Edges such as BD-BQ do not pierce the sweep plane BE-BA-BB, and therefore are not tested because they cannot segment line BA-BB.

As seen from the foregoing, the points BL and BM divide or segment the line BA-BB into segments BA-BL, BL-BM, and BM-BB. Each segment will be determined to be completely visible or completely invisible, as explained below. The center point of each segment is checked to see if it is obscured by any face of the entire model. For example, CP2 is the center point of sector BL-BM, and a ray from the eye point BE to CP2 pierces the visible face BK-BJ-BG-BH at point BP. Therefore, the segment BL-BM is hidden. Similar tests on CP1, the center point of sector BA-BL, and on CP3, the center point of sector BM-BB, show these segments to be visible. Accordingly, segments BA-BL and BM-BB are displayed, and segment BL-BM is stored as a hidden segment, and is either displayed as a dotted line, or not displayed at all.

In order to deal with added or removed objects separately from the rest of the model, for each object in the model, the so-called "wire" object is generated, and separately stored, for each object in the model. The wire object is the equivalent of the solid object which it represents, except that the information on the wire object is limited to the bounding edges of the wire object. In other words, it is stored as though the object were completely hollow, and made up only of wires where the edges of the bounding surfaces would otherwise be. Additionally, however, the wire object information includes information as to which wire edge segments are hidden or invisible, as seen from the eye point. In this respect, the so-called "wire" objects are not true wire objects, but are representative of solid objects. Each object is also retained as a solid object, with information about the bounding planes of the object.

Figure 8:
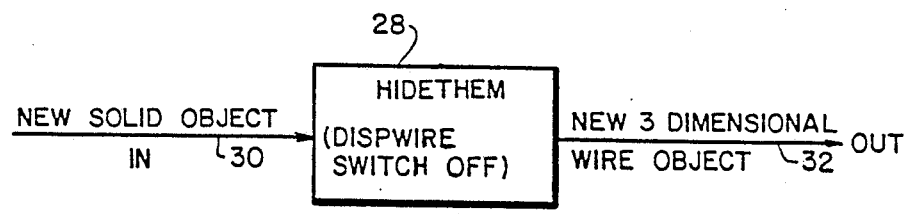
FIGS. 8 and 9 illustrate, in a broad flow chart form, parts of the method according to the invention.
Figure 9:
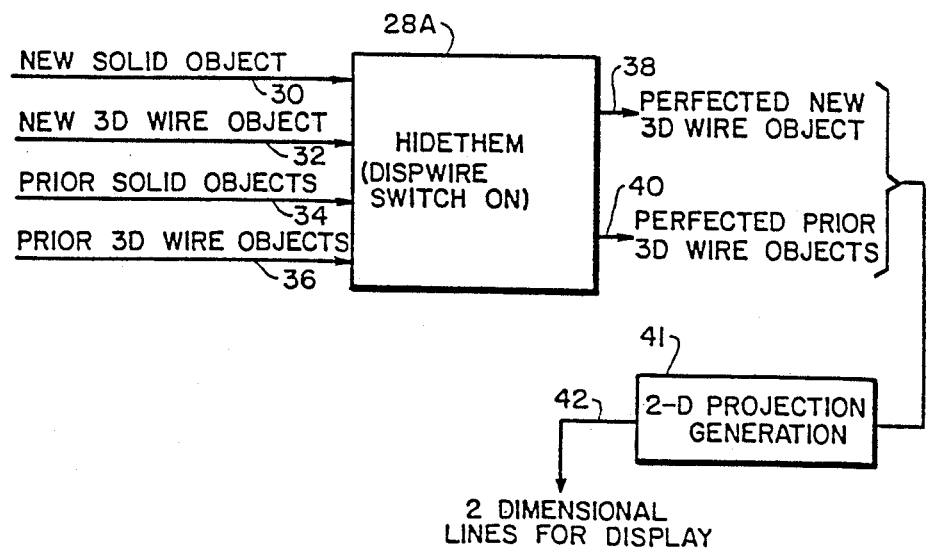

FIG. 8 illustrates, in a very schematic form, a computer routine, which is titled for convenience "HIDETHEM" which is operable to receive information about a new solid object, as indicated at 30, and to generate a new three-dimensional wire object from that information, as shown at 32. This operation occurs in HIDETHEM when a switch named "DISPWIRE" is off. Next, an operation as illustrated in FIG. 9 is carried out, as illustrated schematically at 28A, again using the routine named HIDETHEM, but with the DISPWIRE switch on. Again, the new solid object data is one of the inputs, as indicated at 30, and the new "3D" wire object data just generated in FIG. 8 is another one of the model, as indicated at 32, in FIG. 9. Additional inputs relate to the prior solid objects of the model, indicated at 34, and the prior "3D" wire objects indicated at 36. The resultant outputs include a perfected new "3D" wire object, as indicated at 38, and perfected prior "3D" wire objects, which together, through a 2-D projection generation step 41, provide two-dimensional lines for display of the model, as indicated at 42. The perfected new "3D" wire object at 38 includes information as to previously visible edge line segments which are made invisible by visible faces of the prior solid objects. Similarly, the perfected prior 3D wire objects at 40 include information as to previously visible edge line segments which were made invisible by visible faces of the new solid object.

The basic operation of the HIDETHEM routine in FIG. 8 is for the purpose of determining which of the wire object edge line segments are hidden, or made invisible, by the visible faces of the new solid object itself. The basic operation of HIDETHEM in FIG. 9 is for the purpose of determining which edge line segments of the new "3D" wire object are hidden or made invisible by the visible faces of the prior solid objects, and also to determine which previously visible edge line segments of the prior "3D" wire objects are hidden or made invisible by the visible faces of the new solid object.

The operations broadly illustrated in FIGS. 8 and 9 are given in more detail in the following flow charts.

Figure 10:
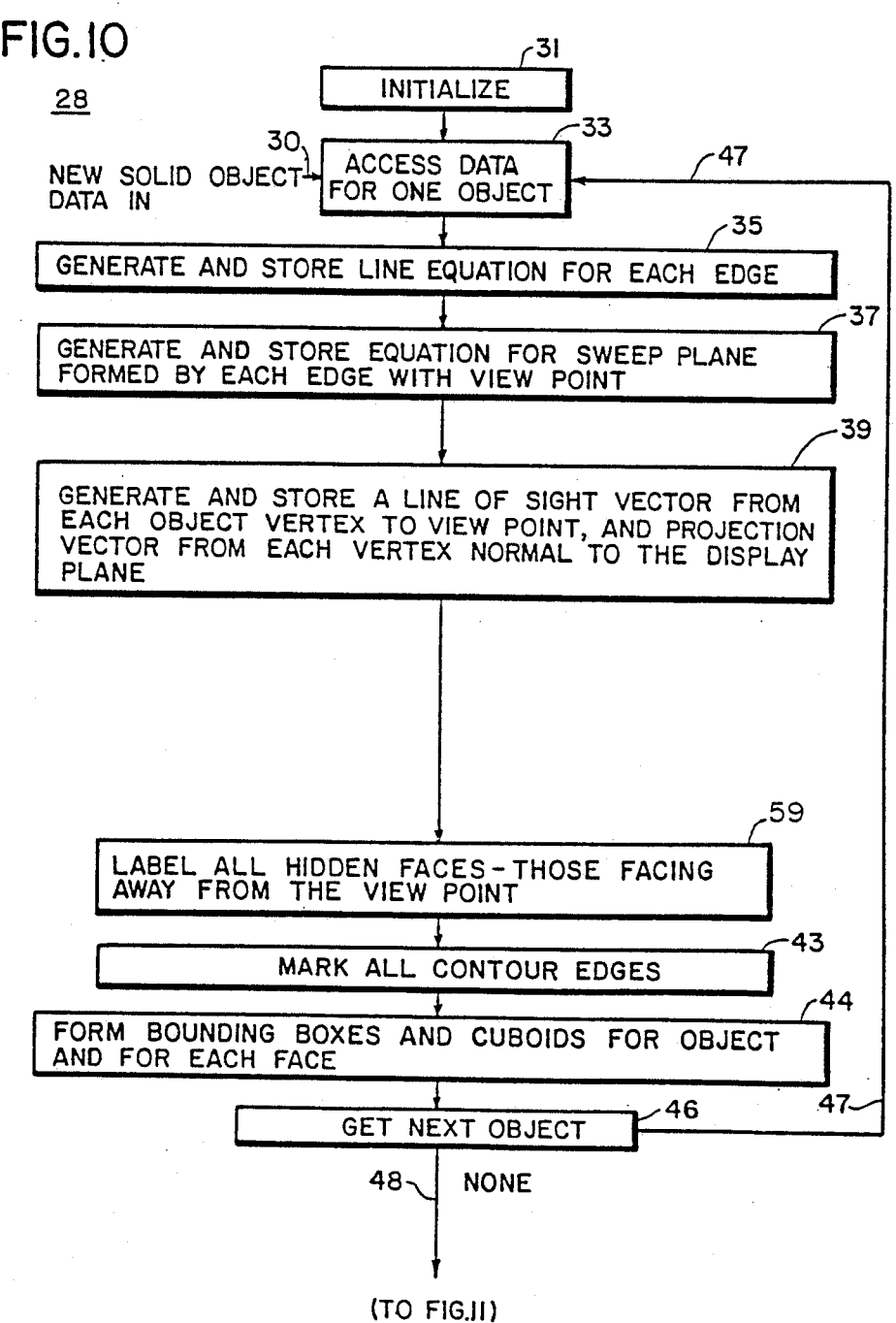
FIGS. 10, 11, and 12 illustrate a major routine of a preferred form of the invention in flow chart form which is named HIDETHEM.
Figure 11:
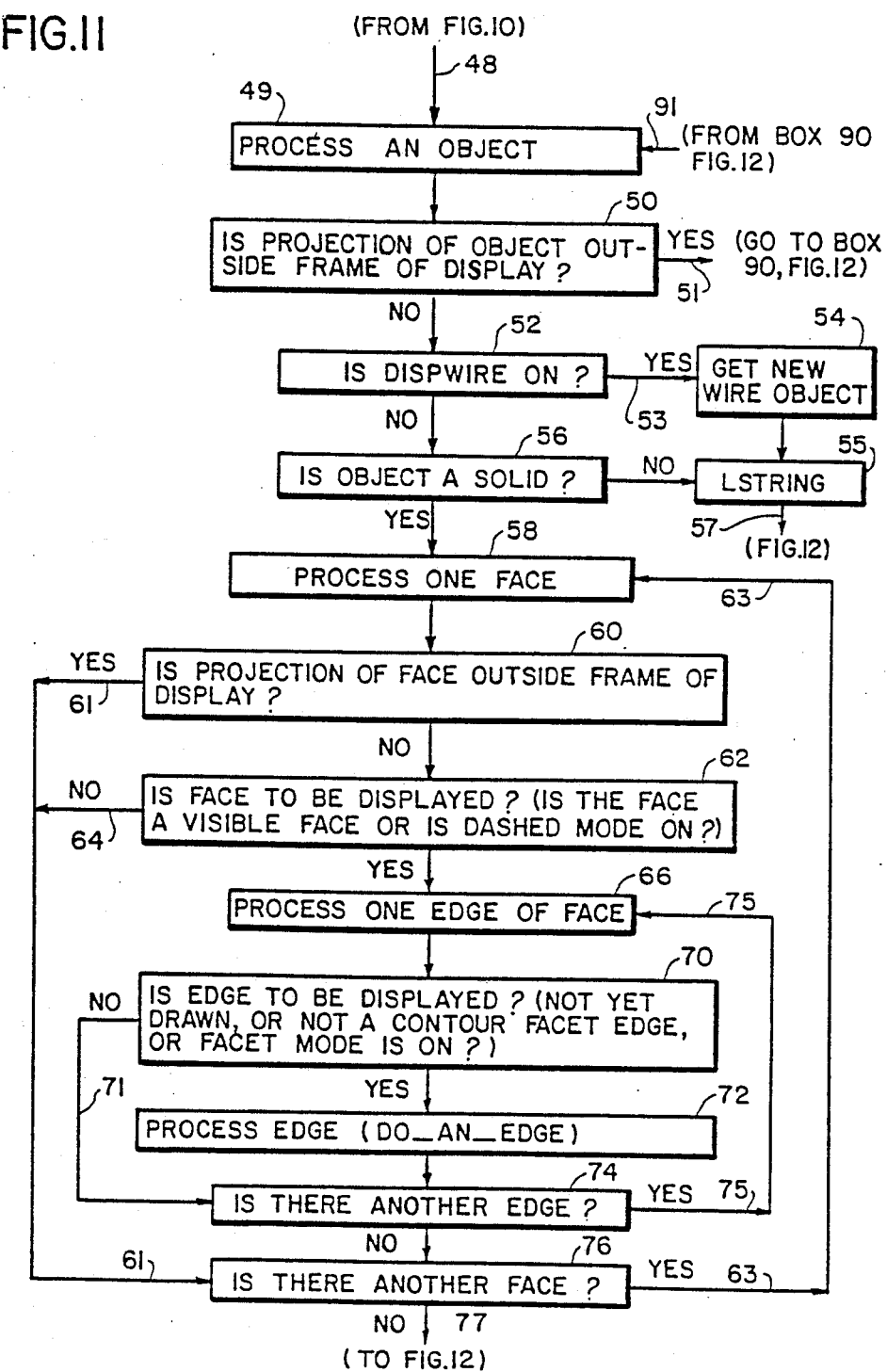
Figure 12:
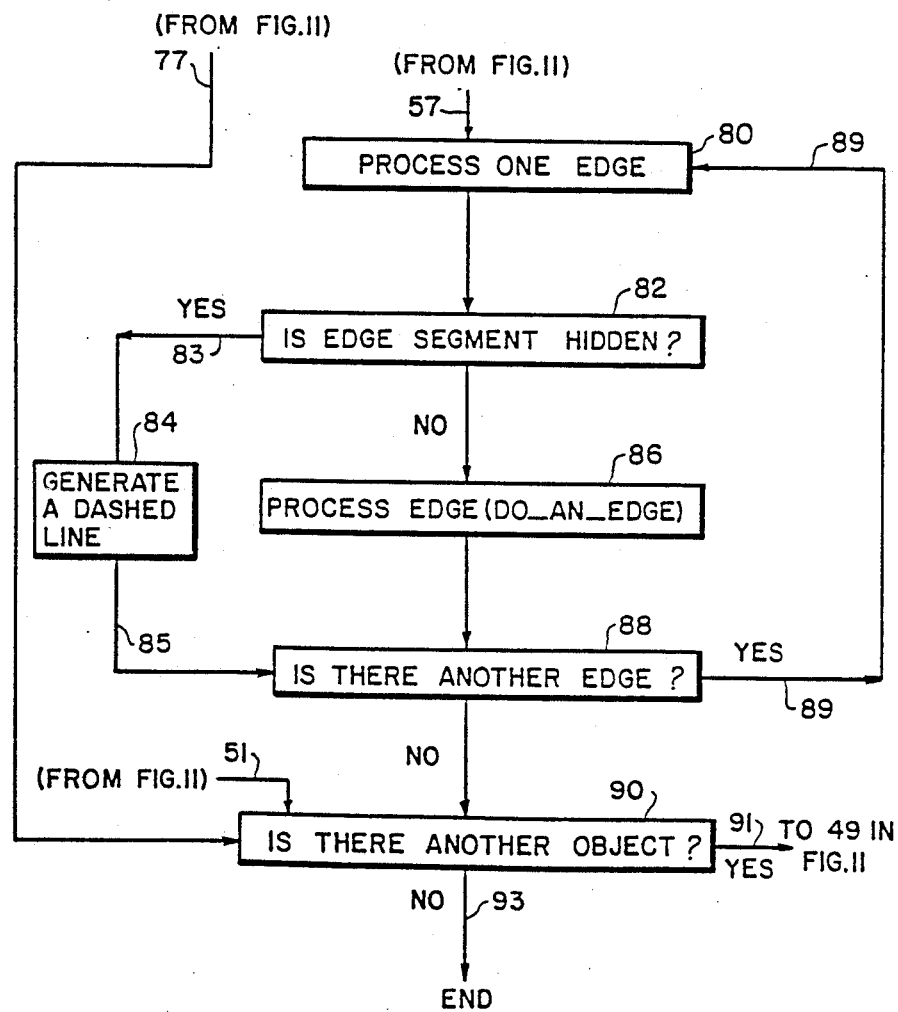

FIGS. 10, 11, and 12 together form a flow chart giving the HIDETHEM method routine 28 and 28A of FIGS. 8 and 9 in more detail.

Referring more particularly to FIG. 10, at the first step 31, the system is initialized, including the allocation of space in a computer memory for the subsequent operations to be described. Next, at step 33, data is accessed for one object. If the system has been in operation for some time, and a new object is being added to the model, this will involve accessing the data for the new solid object, as indicated at 30, and as previously indicated at 30 in FIG. 8. If data for a number of objects is already available, the data for each object is accessed at 30 in sequence, with the data for one object being accessed and processed at a time. Thus, the immediately subsequent set of process steps relate to the single object which is being processed.

At the next step 35, line equations are generated for each edge, to define that edge for further processing. These equations each consist of three direction cosines and a line length based on inputs consisting of the coordinates of two end points.

In the next step 37, an equation is generated for each edge for the sweep plane formed by the edge with the view point. This relates to the sweep plane generation previously described above in connection with the description of FIG. 7 with the example of the generation of the sweep plane BA-BB-BE. The sweep plane equation consists of the three cosines defining the direction of a vector normal to the plane together with a dimension representing the distance from the reference origin to the plane along a line from the origin which is normal to the plane.

The data with respect to each object is generated and stored based upon three-dimensional geometry, even though the model is to be displayed in two dimensions.

At step 39, there is generated and stored a line-of-sight vector from each object vertex to the view point, and a projection vector normal to the display plane from each vertex.

In step 59, all hidden faces are labelled as such. These are the faces which are facing away from the view point, and are thus not visible from the view point. This operation is carried out by taking the dot product of the line of sight to each vertex of the face and the face normal vector. If the dot product is positive, the face is hidden. If the dot product is negative, the face is visible.

Next, in step 43, all of the contour edges are marked. An edge is defined as a contour edge if one of the faces it separates is visible, and the other one is invisible.

In the next step 44, bounding boxes and bounding cuboids are generated for the object and for each face. The term "bounding box" means the smallest axially oriented rectangle in the viewing plane which will enclose or bound the projection of the object, or of the face to which the bounding box relates. Information about the bounding boxes is stored for future reference, and is extremely useful for determining whether or not there is any overlap between one object, or one face, and another element of the model, in order to quickly exclude further tests for visibility of lines based on possible overlap. This feature was previously mentioned above. The advantages will be more apparent from further steps in the process as described below. The cuboid for an object is the smallest axially oriented rectangular parallelepiped which will completely enclose the object. The cuboid for a face is similarly defined. As with the boxes, the information about the cuboids is stored, and is used to quickly check for possible overlaps between objects of faces.

The above steps complete the initialization with respect to one object, and in step 46, a check is made to see whether there is another object in the model. If there is, as indicated at 47, step 33 is again initiated to initialize with respect to the next object. If the test at 46 indicates that there are no further objects, then the method continues, as indicated at 48, at the top of the next figure, FIG. 11.

Continuing with FIG. 11, where the HIDETHEM routine is continued, step 49, which receives the signal at 48 from FIG. 10, initiates the processing of an object in the further steps which are described below. As additional objects are to be processed, a signal is received at box 49 from connection 91 from process step box 90 on FIG. 12 to be described below.

Next, in step 50, a test is made to determine whether the projection of the object is outside of the frame of the display. In other words, in the display mode which is presently called for, will this object be excluded? If the test result is "yes", no further processing of the object is necessary, and a signal is provided as indicated at 51, which is carried to box 90 of FIG. 12 and which ultimately will cause the process to loop to the next object, if one is available.

If the test result is "no", the method proceeds to the next step 52, where a determination is made as to whether the switch DISPWIRE is on. This is the switch referred to in connection with the description of FIGS. 8 and 9, and which made the difference between FIG. 8 and FIG. 9. If the DISPWIRE switch is on, then the system is in the mode represented in FIG. 9. An output then appears at connection 53, calling up the information about the new wire object in step 54, and continuing to step 55 which invokes a routine called LSTRING. LSTRING forms the final part of HIDETHEM beginning at the top of FIG. 12 at connection 57, which is described below.

If the answer at test 52 is "no", then another test is made to determine whether the object is solid in step 56. If the object is not a solid, then it is referred to as a line string, and again the routine LSTRING at 55 is invoked. A line string refers to an object such as a cable harness which does not have any substantial dimensions except in one direction. That is, it is a long stringy object of some kind which is to be shown in the image, but which does not have any substantial faces which would obstruct the visibility of any edges of solid objects.

If the result of the test in 56 is "yes", then the process continues with the next step 58 which initiates the processing of each face of the object, one face at a time. That process begins with step 60. A test is made to determine whether the projection of the face is outside of the frame of display. This makes use of the bounding box generated in step 44 of FIG. 10. Thus, if the bounding box falls outside of the display, there is no need to process the face. Then the answer is "yes", and an output appears at the left of the box 60, at connection 61, which is carried down to a test step 76 to check whether there is another face to be processed in the object, bypassing the remainder of the face process steps. If the answer is "no", another test is made at step 62 to determine whether the face is to be displayed, in terms of determination as to whether the face is a visible face, of if the dashed mode is on. As previously explained in the specification, the objects of the model may be displayed with hidden lines completely removed, or with the hidden lines shown dashed. If hidden lines are shown dashed, then hidden faces are displayed by means of the dashed edge lines. If the answer is "no", and the face is not to be displayed, another output is produced to connection 61, as indicated at 64, again short-cutting the rest of the face processing loop and going on to another face, or to later steps.

If the answer is "yes", the process proceeds to the next step 66 which represents the entry into a face edge processing loop. The first step 70 in the edge processing loop determines whether or not the edge is to be displayed. If the decision has already been made to display the edge, and the edge has already been processed in connection with another face which is common to the edge being processed, then it need not be again processed in this loop. Accordingly, the answer to this test is then "no". If this test answer is "no", or if either of the other tests indicate the edge is not to be displayed, an output is provided at connection 71 to a test step 74 to determine if there is another edge to be processed for this face. The other two tests applied in step 70 relate to the presentation of contours in the image. While not previously discussed it is contemplated that contours which are not flat faces will be represented. These representations are often in terms of multiple facets which approximate a curved surface, such as the curved surface of a cylinder or of a cone. If the facet mode is on, all of the edges of the individual facets are displayed. However, even if the facet mode is not on, the contour facet edge will be displayed. Accordingly, these tests are also made to determine whether the edge is to be displayed or not.

If the answer is "yes", theprocess proceeds to step 72 which involves.entering a sub-routine called DO AN EDGE which is described in detail below in connection with FIGS. 13 and 14. This sub-routine, at this juncture, compares the edge line segments of the current object with the visible faces of the other objects to determine which edges and edge segments are hidden and invisible.

After DO AN EDGE is completed, the test step 74 is entered to determine whether there is another edge to be processed. If the answer is "yes", the edge loop is again entered at 66, as indicated by a connection 75. If not, a test is made at 76 to determine whether there is another face to be processed, and the face process loop is again entered at 58 via a connection 63 if the answer is "yes". If the answer is "no", the process continues, as indicated at 77 to steps shown in FIG. 12.

The process continues on FIG. 12 with a continuation of the HIDETHEM process which is further identified as LSTRING. The output 77 from the bottom of FIG. 11 is carried down to the last step shown on FIG. 12 to test whether or not there is another object to be processed. If so, the object process loop is restarted by a signal on output connection 91 to the first process box 49 on FIG. 11. If not, the process ends, as indicated at 93.

When the LSTRING process is carried out, it begins with the input at 57 received from FIG. 11 at step 80. This begins the process loop for one edge. The process loop continues with a step 82 in which a test is made to determine whether the edge segment under consideration is hidden or not. If not, the step 86 is performed of processing an edge under the sub-routine DO AN EDGE. This is the same step as discussed above at 72 in FIG. 11, and involves comparing edge segments with visible faces.

If the test result at step 82 is "yes", as indicated by an output at 83, then step 84 is effective to generate and display a dashed line for the hidden edge segment and saved it in the wire frame object in memory. Furthermore, at this point, the edge is preferably encoded as visible or invisible and as a contour or non-contour edge segment. After step 84, as indicated at 85, the process proceeds with the next step 88. The step 88 is also entered from the path including step 86.

In step 88, a test is made to determine whether there is another edge to process. If the answer is "yes", as indicated at 89, the process loops back to the beginning of the edge processing method at step 80. If there is no additional edge to be processed, then the method continues with the next step 90, which is a test to determine whether there is another object to be processed. If not, the method is complete, as indicated at 93. However, if there is another object to be processed, the resultant output at 91 is carried back to step 49 in FIG. 11 to begin the object processing loop again.

Figure 13:
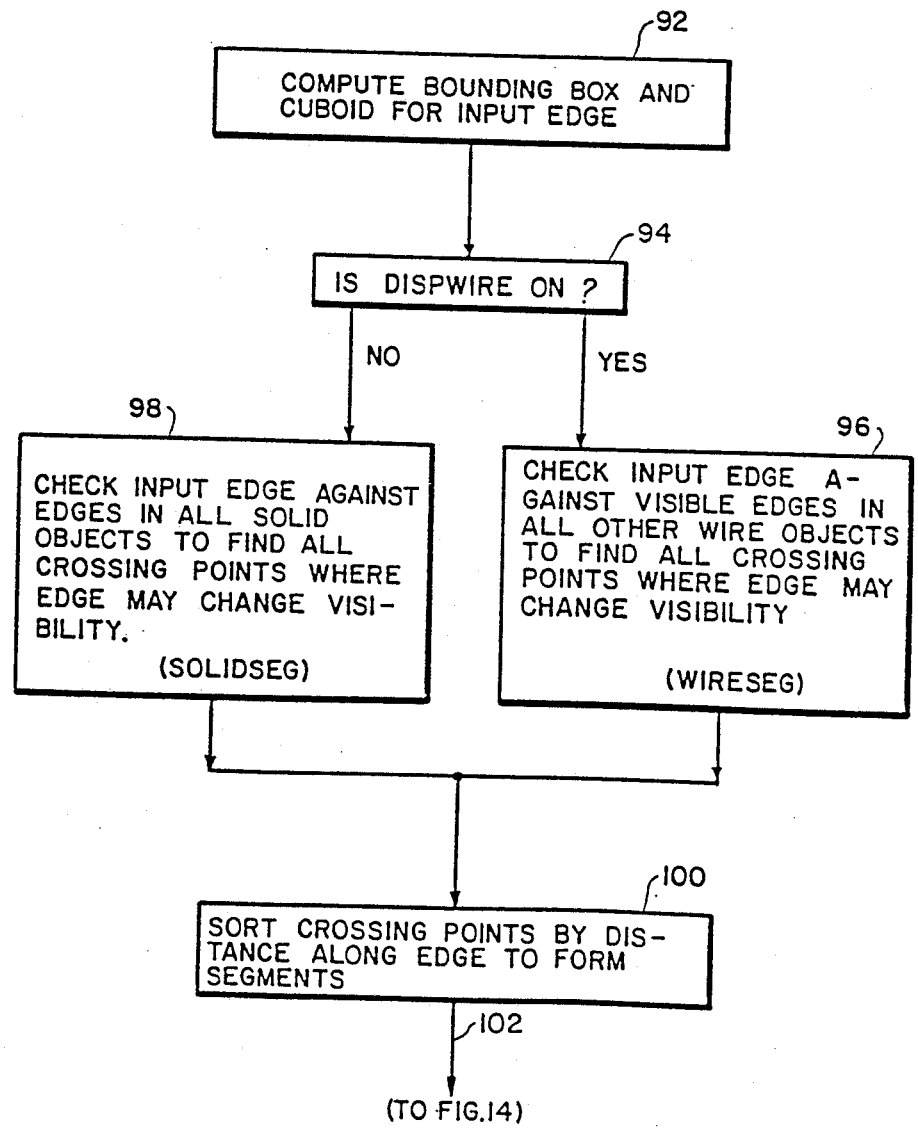
FIGS. 13 and 14 together constitute a flow chart illustrating a sub-routine of the method of the invention for processing individual edges of the model and entitled DO AN EDGE.
Figure 14:
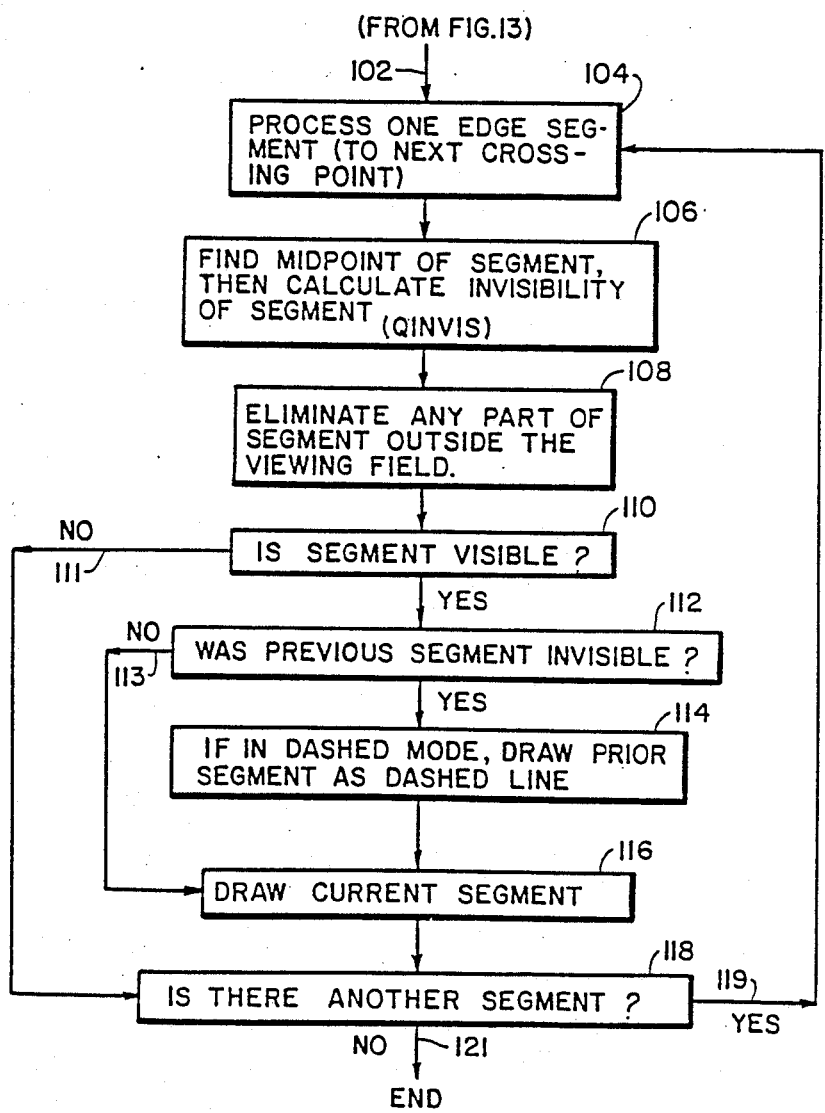

FIG. 13 and FIG. 14 together form a flow chart illustrating the operation of the sub-routine DO AN EDGE previously referred to in connection with the method described in connection with FIGS. 10, 11 and 12. The routine begins with step 92 by computing a bounding box and cuboid for an input edge line to be processed. Next, at 94, a test is made to see whether DISPWIRE is on. If the answer is "yes", step 96 is entered in which the input edge is checked against visible edges in all other wire objects to find all crossing points where the edge may change visibility. This is carried out with a sub-routine called WIRESEG which is described more fully below in connection with FIG. 17.

WIRESEG searches all of the wire objects (except the one containing the present input edge) to find the visible contour edges which might cross in front of the input edge.

If DISPWIRE is not on at step 94, then step 98 is entered. In step 98, the input edge is checked against the edges in all solid objects to find all crossing points where the edge may change visibility. This is carried out in a sub-routine called SOLIDSEG, which is further described below in connection with FIG. 15. SOLIDSEG searches all of the solid objects to find contour edges which might cross in front of the input edge which is under consideration.

After the completion of either step 96 or step 98, step 100 is followed, in which the crossing points determined in steps 96 or 98 are sorted by distance along the input edge under consideration to form edge line segments. The method then continues on, as indicated at 102, to the top of FIG. 14.

Continuing at the top of FIG. 14, a routine is shown for processing one edge segment (to the next crossing point) beginning at process step 104. The process continues with step 106 by finding the mid-point of the segment and then calculating the invisibility of the segment. This is carried out in a sub-routine called QINVIS, which is described more fully below in connection with FIG. 18.

In the next step 108, any part of the segment outside of the viewing field is eliminated. Next, in step 110, a test is made, which relies upon the previous output from step 106, to determine whether the segment is visible. If the answer is "no", the remainder of the sub-routine is aborted by going immediately to step 118, as indicated at 111. However, if the test is positive, we proceed to the next step 112 which applies the test to determine whether the previous segment was invisible. If the answer is "no", then the method branches at 113 to step 116, causing the current segment to be drawn or stored as a visible segment.

Otherwise, the method proceeds to the next step 114 which operates, if the machine is in dashed mode, to draw the previous segment as a dashed line. If the display is to be saved on file, an entry is made for the previous segment in the output file. Also, the edge segment is entered into the output wire object with the encoding required to indicate whether the line segment is visible or invisible and whether it is a contour or non-contour line segment.

Next, in step 116, the current segment is drawn. If the DISPIRE switch is on, a solid line is displayed, and if the display is to be saved on file, an entry is made in the output file. Also, DPEN calls up PEN3D, which enters the edge into the output wire object, and encodes the edge line segment as visible or invisible and as a contour or non-contour line.

Next, in step 118, a test is made to determine whether there are any more segments. If so, the process loops to step 104, as indicated at 119. Otherwise, the sub-routine ends, as indicated at 121.

Figure 15:
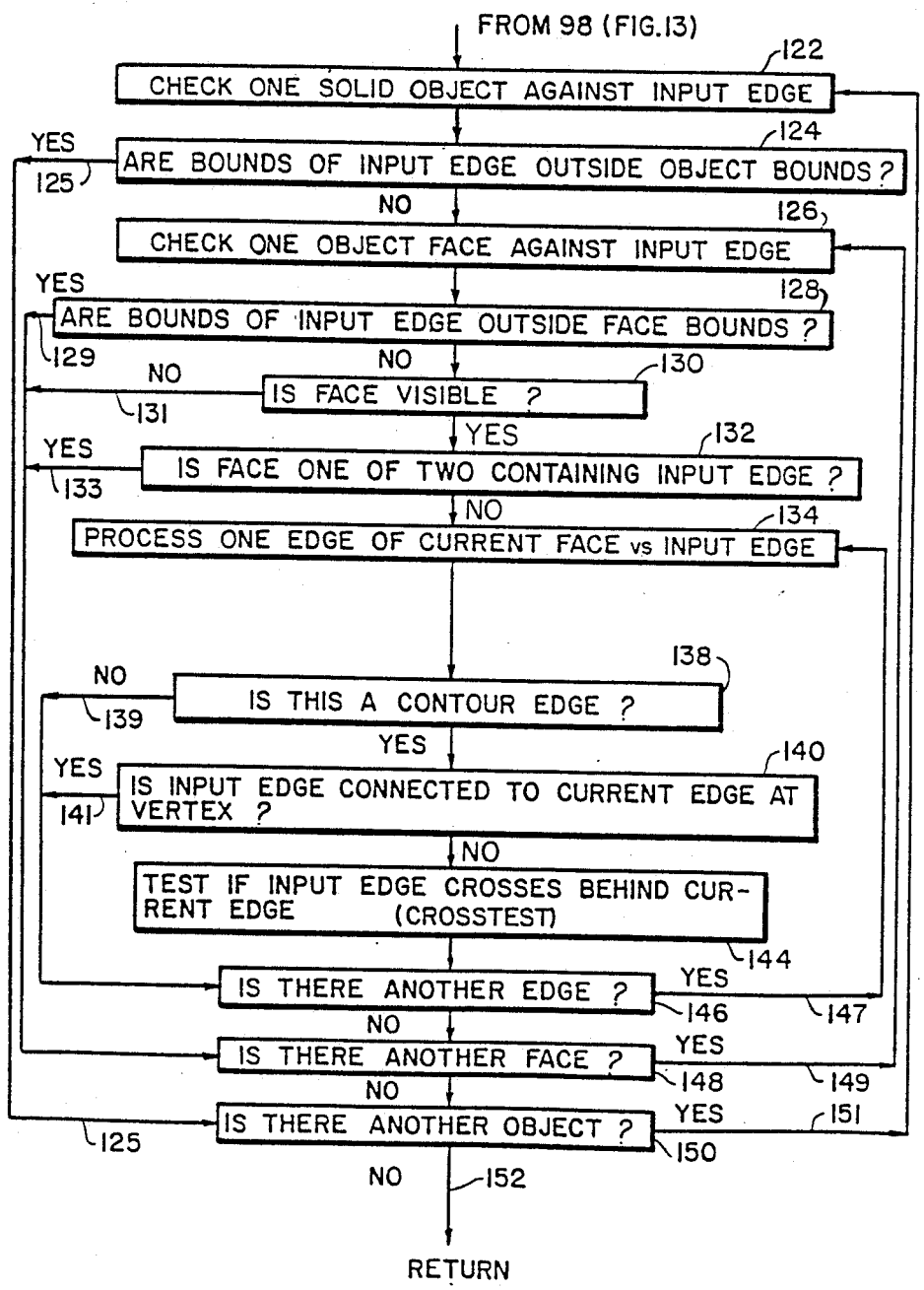
FIG. 15 is a flow chart illustrating another sub-routine of the method of the invention for processing solid objects of the model and entitled SOLIDSEG.

FIG. 15 is a flow chart of the sub-routine entitled SOLIDSEG which was previously mentioned in connection with step 98 of FIG. 13 as a part of the sub-routine DO AN EDGE. As shown at the top of FIG. 15, the process begins from step 98 of FIG. 13 with the process step 122 which begins the process of checking one solid object of the model against the input edge to be displayed.

This process continues with step 124 in which a test is made to determine whether the bounding box of the input edge is outside the bounding box of the object. If the answer is "yes", as indicated at 125, there is no need to check this particular object against the input edge. Accordingly, the process skips immediately to the last step 150 to determine whether or not there is another object in the model to be checked against the input edge. If the answer is "yes", as indicated at output 151, the method begins again at step 122.

Returning again to step 124, if the answer to the test is "no", the process continues to step 126, beginning the process of checking one face of the object against the input edge.

Next, in step 128, a test is made to determine whether the bounds of the input edge are outside the bounds of the face under consideration. Even though the object is not totally outside the bounds of the input edge (Test step 124) the face may be. If the answer is "yes", as indicated at 129, no further processing of that face is necessary. Accordingly, the process skips to step 148 to determine whether there is another face to be processed.

If the answer to the test in step 128 is "no", the next step 130 detemines whether the face is visible. If the face is not visible, as indicated by an output at 131, then the face will not affect the visibility of the input edge, and no further processing with respect to this face is necessary. Accordingly, the process again skips to step 148. If the answer is "yes," then the method continues to step 132.

The next step 132 is a test to determine whether the current face is one of the two containing the input edge. If the answer is "yes", as indicated at 133, then the face cannot change the visibility of the input edge, and again, the method skips to step 148. If the answer is "no", then the method continues to step 134.

In the next step 134, the method begins the processing of one edge of the current face against the input edge. Next, in step 138, the test is made to determine whether this edge of the current face is a contour edge. If the answer is "no", as indicated at 139, the edge cannot affect the visibility of the input edge, and the method continues with the processing of the next edge through step 146.

If the answer is "yes", the next step 140 tests to see whether the input edge is connected to the contour edge of the face at a vertex. If the answer is "yes", as indicated at 141, the current face edge cannot affect the visibility of the input edge, and again the process is continued with another edge, if any, through step 146.

If the last test result is "no", the method continues with step 144 in which a test is made to see if the input edge crosses behind the current face edge in a sub-routine called CROSSTEST, which is described more fully below on connection with FIG. 16.

After CROSSTEST is completed, the next step in the present sub-routine is step 146 in which the test is made as to whether there is another edge to the current face. If the answer is "yes", as indicated at 147, the edge processing loop is again started at step 134. If the answer is "no", a test is made at step 148 to determine whether there is another face to the current object. If the answer is "yes", as indicated at 149, the face processing loop is again started at step 126.

If there are no more faces to the current object, then the method continues in step 150 with a test as to whether there is another object present in the model which should be processed. If the answer is "yes", as indicated by the output at 151, then the entire method is started again at step 122 with respect to a new object. If the answer is "no", the sub-routine is ended, as indicated at 152, and a return is made to the sub-routine DO AN EDGE at step 98 on FIG. 13.

Figure 16:
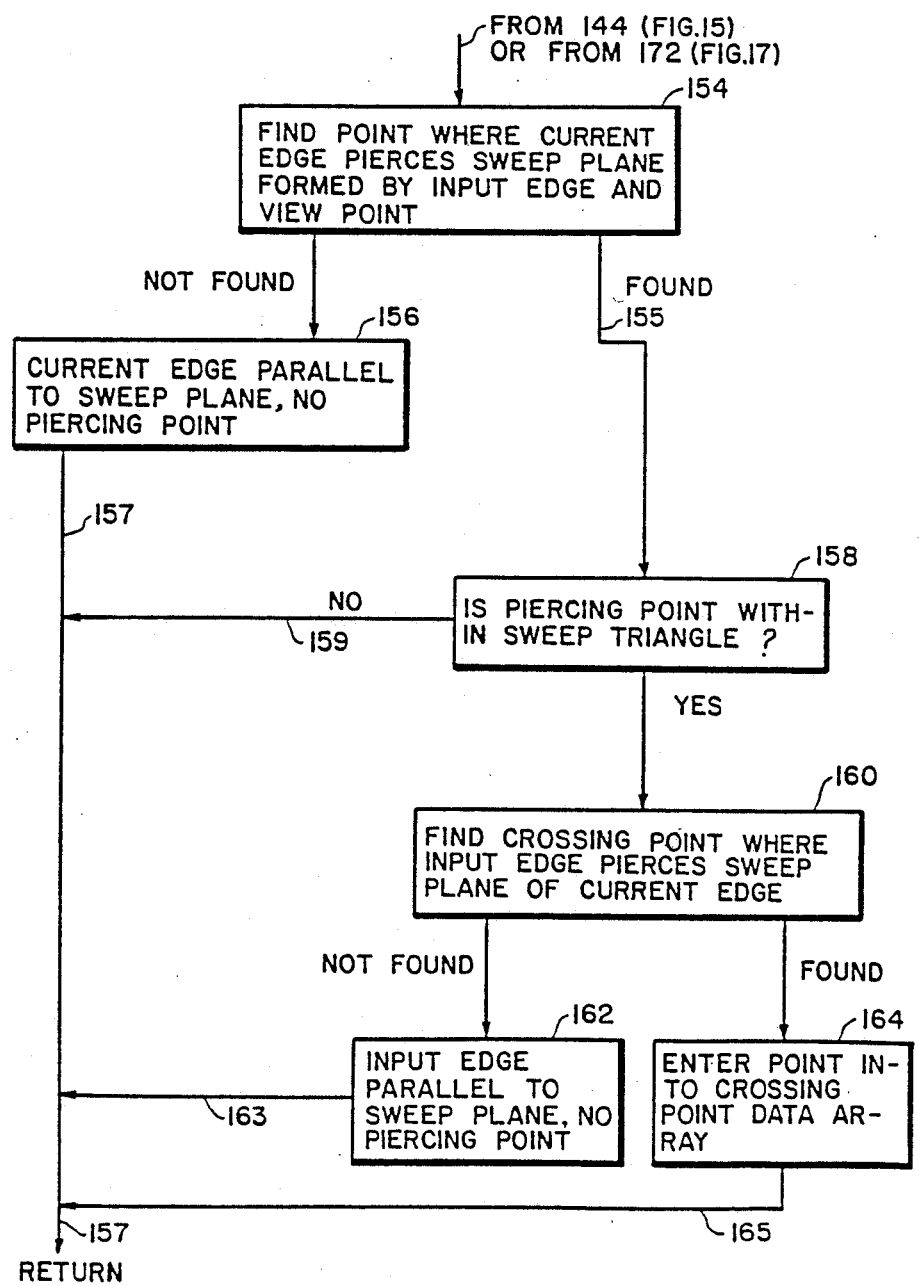
FIG. 16 is a flow chart illustrating another sub-routine of the method of the invention for determining where lines of the image cross one another and entitled CROSSTEST.
Figure 17:
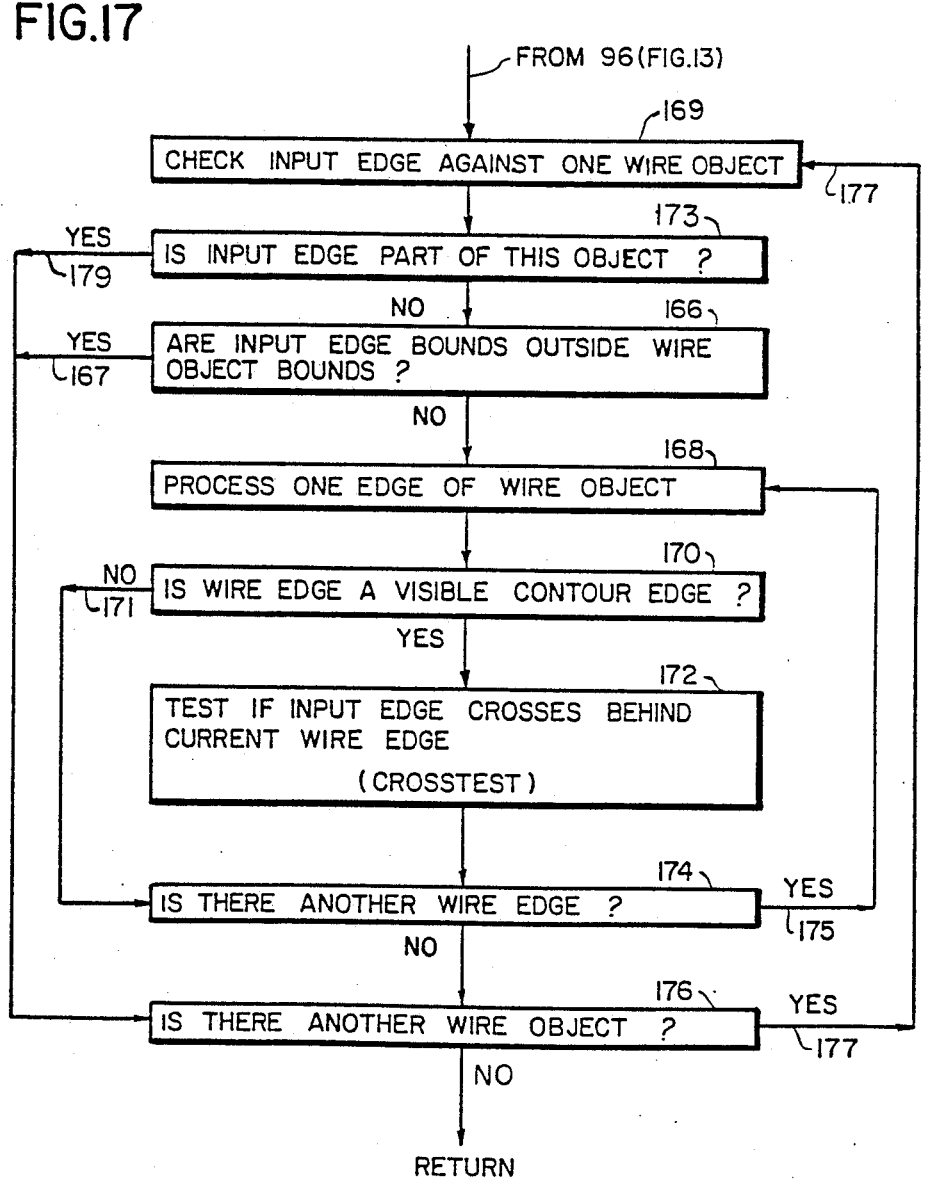
FIG. 17 is a flow chart illustrating another sub-routine of the method of the invention for processing the edge lines of the model as though the edge lines were wires, and bearing the name WIRESEG.

FIG. 16 illustrates the CROSSTEST sub-routine used in step 144 of FIG. 15 and in step 172 of FIG. 17. The purpose of the CROSSTEST routine is to determine whether the input edge crosses behind the current edge. In order to accomplish this determination, the first step at 154 is to find where the current edge pierces the sweep plane formed by the input edge and the view point. This sort of an operation was described previously above in connection with FIG. 7 where the construction of a sweep plane including the (input) edge BA-BB and the view point BE was described, and the piercing of that plane by the contour edge BC-BD at BF was described. If the determination in step 154 is not successful, it will be because the current edge is parallel to the sweep plane. This is signified by the step 156 (which really is not a step, but explains the failure of step 154). If this failure occurs, the sub-routine has been completed with respect to the current edge, and the process is returned to the parent sub-routine of which it is a part, as signified by the return line 157.

If the operation of step 154 is successful, as signified at 155, then the next step 158 tests to determine whether the piercing point is within the sweep triangle. Referring again to FIG. 7, if the piercing point (such as BF) is not within the sweep triangle BA, BB, BE, then the current edge will not affect the visibility of the input edge in any way. Accordingly, a negative answer to this test, as indicated at 159, indicates completion of the CROSSTEST sub-routine.

If the answer to the test 158 is positive, the process continues to step 160 where the crossing point is found where the input edge pierces the sweep plane of the current edge. The sweep plane of the current edge is defined as a plane including the current edge and the view point. Thus, referring again to FIG. 7, the plane is one which includes the view point BE and the current edge BC-BD. It will be apparent that the point where the input edge BA-BB pierces that plane will be the point BL, the point which it is desired to define. Assuming the operation is successful, the next step 164 is effective to enter the point just determined into the crossing point data array, and then to signal the end of the CROSSTEST sub-routine, as indicated at 165.

If the operation at step 160 is not successful, as indicated at 162, the reason for that failure will be that the input edge is parallel to the sweep plane of the current edge with the view point, so that there is no piercing point. In that instance, the end of the CROSSTEST routine is indicated as shown at 163.

FIG. 17 is a flow chart representing the steps in the sub-routine called WIRESEG which is invoked as a part of DO AN EDGE as shown at 96 in FIG. 13.

Step 169 is the entry into the process loop in which the input edge is checked against one wire object. In step 173 the process continues with a test to determine whether the input edge constitutes a part of the current object. If the answer to this is "yes", as indicated at 179, the object cannot affect the visibility of the input edge, and accordingly, the process switches to the final step 176 preparatory to processing another object.

The next step 166 imposes the test as to whether the input edge bounding box is outside of the wire object bounding box. If the answer is "yes", as indicated at 167, the current object cannot affect the visibility of the input edge, and again the rest of the method is bypassed to the final step 176.

If the answer is "no", a processing loop is entered in which individual edges of the wire object are processed, beginning at step 168. This loop includes a step 170 in which a test is made to see whether the current wire edge is a visible contour edge. If the answer is "no", as indicated at 171, then the present wire edge cannot afffect the visibility of the input edge, and no further processing is required with respect to the current edge so that the process immediately proceeds to step 174 for the processing of the next edge.

On the other hand, if the answer is "yes", then step 172 is entered, which proceeds with the test to determine whether the input edge crosses behind the current wire edge in the sub-routine called CROSSTEST which was described above in detail in connection with FIG. 16. After the completion of CROSSTEST, step 174 is entered in which a determination is made as to whether there is any additional wire edge for processing in the present object. If the answer is "yes", as indicated at 175, the edge processing loop is reactivated at step 168. If not, the method proceeds to step 176 where a determination is made as to whether there is another wire object to be processed. If the answer is "yes" process is repeated starting with step 169 as inqicated by the connection 177 from 176 to 169. On the other hand, if the answer is "no", the sub-routine is ended, and the process returns to step 96 in FIG. 13 (DO AN EDGE).

FIG. 18 is a flow chart for a sub-routine called QINVIS which is operable to determine the visibility or invisibility of an edge line segment with respect to the various visible faces of objects. The sub-routine QINVIS is called for at step 106 in FIG. 14 as part of the sub-routine DO AN EDGE.

Starting at the top of FIG. 14, the sub-routine process begins from step 106 of FIG. 14 at step 178, where the edge line segment is initialized as invisible. Unless the method of QINVIS establishes that the line segment is visible, it remains invisible.

Next, in step 180, there begins the processing of one object of the model against the input edge line segment. This process continues with step 182 in a test to determine whether the gross boundaries of the input edge are outside of the gross boundaries of the object. If the result of the test is positive, as indicated at 183 in the drawing, there is no way that the presently processed object can affect the visibility of the input edge. Therefore, the method proceeds directly to the last step of the object loop at 198. However, if the answer is "no", the process continues to step 184 with the beginning of a series of steps to process each face of the object, one at a time, against the input edge segment.

The next step 186 tests to determine whether the face is visible. If not, as indicated at 187, the face cannot affect the visibility of the input segment, so the face processing loop is bypassed to the last face processing step 196. However, if the face is visible, the method continues with the next step 188 to determine whether the face is one of those bounded by the input edge. If the answer is "yes", as indicated at 189, the face cannot change the visibility of the input edge, and again the face processing loop is bypassed. If the answer is "no", the next step 190 is operable to find the point at which a line drawn from the view point to the midpoint of the input edge segment pierces the plane of the face. Referring back to FIG. 7, this refers to the determination of point BP, which is the point at which the line BE-CP2 intersects the face BK-BH-BG-BJ.

Next in step 192, a determination is made as to whether the pierce point is closer to the view point than the midpoint of the input edge segment. In other words, this is a determintation as to whether the face being processed is actually in front of the edge segment, a necessary condition for hiding the edge segment. If the answer is "no", as indicated at 193, the face cannot hide the edge segment, and the process continues with a different face from step 196. If the answer is "Yes," the process continues with step 194.

Next, in step 194, a test is made to determine whether the pierce point (which is known to lie in the face plane) actually lies inside the material boundary of the face. If the answer is "yes", as indicated at 195, then the segment is hidden or invisible, and the answer required from this sub-routine has been obtained, and the initialized invisible state is allowed to stand, and the program is returned to step 106 in FIG. 14 (DO AN EDGE).

If the answer to test 194 is negative, the edge segment is not hidden by this face, and the method continues in step 196 with the test to determine whether there is another face of the object to be tested. If the answer is "yes", as indicated at 197, the face processing loop is reentered at step 184. If the answer is "no", the method proceeds to the next step 198 with the test as to whether there is another object to be processed. If that answer is "yes", as indicated in 199, the object processing loop is reentered at step 180. If there are no other objects to be processed, then no basis has been found for establishing that the input edge segment is invisible, then the "No" answer leads to step 200, and in step 200, the state of the edge is changed to visible and recorded in that state before returning to DO AN EDGE at step 106 of FIG. 14.

It will be understood that the principles of the present invention may be applied to planar geometric projection line images which are essentially true perspective projections, or orthogonal projections, or projections which offer various approaches to a presentation of solid objects in a single plane which approximate a perspective presentation, and which may be characterized by various terms.

The operations described above in connection with the various flow charts (FIGS. 10 through 18) for determining visibility of each input edge may be highlighted as follows: In either SOLIDSEG (FIG. 15) at step 98 of WIRESEG (FIG. 17) at step 96, there is included the step of determining whether a current face edge under consideration is a visible contour edge (at steps 138 or 170). It is essential that the current edge under consideration must be a contour edge in order to have any effect on the visibility of the input edge.

Each of the sub-routines SOLIDSEG and WIRESEG then incorporate the sub-routine CROSSTEST (at steps 144 or 172), and CROSSTEST (FIG. 16), at step 154, finds the point where the current edge pierces the sweep plane formed by the input edge and the view point. This is an essential condition for the current edge to affect the visibility of the input edge.

At step 160 in FIG. 16, the crossing point where the input edge pierces the sweep plane defined by the current edge and the view point determines the exact point which defines the end of a segment of the input edge. In step 100 of FIG. 13, the crossing points previously determined are sorted in order to define the individual segments.

At step 106 of FIG. 14, the QINVIS sub-routine is entered, and salient features of that sub-routine include step 190 on FIG. 18 to find the point at which a line from the view point to the midpoint of an edge segment pierces the plane of a face, and, in step 192, a determination is made as to whether the pierce point is closer to the view point than the edge segment midpoint. These are tests which are essential for determining that the face actually makes the line segment invisible.

Much of the above description has been in terms of adding one object at a time to an existing model. However, it will be understood that a small model consisting of a number of objects can easily be added to an existing model. Accordingly, the additions do not have to be at a rate of one object at a time in order to obtain the advantages of the invention.

The invention has been described in terms of the generation of images as viewed from a single eye point or view point. However, it is one of the important advantages of the present invention that the method of the present invention provides for such a striking increase in the speed with which hidden line objects may be displayed that it is now much more practical to generate and store the information necessary for displaying projections of the same structure from a number of view points, so that the different projections may be called up and displayed in quick sequence.

While this invention has been shown and described in connection with particular preferred embodiments, various alterations and modifications will occur to those skilled in the art. Accordingly, the following claims are intended to define the valid scope of this invention over the prior art, and to cover all changes and modifications falling within the true spirit and valid scope of this invention.

Having thus described the invention, what is claimed as new, and desired to secure by letters patent is:

1. An improved method for producing planar geometric projection images from a computer model by introducing changes comprising the following steps: the lines representing each edge of each face of each object of a model for producing a multiple object image are segmented at line of sight intersections with other lines representing contour edges of visible faces, each resulting edge line segment is checked against all visible faces to determine which are visible and which are invisible and information on visibility is stored together with detailed information on each edge line segment for each object, the model is then modified by changing the number of component objects and after each change checking the edge line segments for visibility only with respect to the changes associated with the changed component objects.

2. An improved method for changing a planar geometrical projection image of a compound physical structure which is comprised of a plurality of component objects having separate boundary faces, the method comprising separately storing information for each object on each segment of each edge line formed by an object face edge, said edge lines being segmented at line of sight intersections with other lines representing contour edges of visible faces, checking each edge line segment against all visible faces to be represented in the image to determine which edge line segments are visible and which are invisible, including information on visibility with the information stored for each edge line segment, and then modifying the image by changing the number of component objects and after each change in number of objects checking edge line segments for visibility only with respect to the changes associated with the changed objects.

3. A method as claimed in claim 2 wherein the segments of the input edge lines of object faces are determined by checking to see whether each edge of a potentially obscuring face is a visible contour edge, finding the point where said contour edge pierces a sweep plane defined by view point and the input edge, determining whether the piercing point is within a triangle defined by the view point and the ends of the input edge, finding the point where the input edge pierces a sweep plane defined by the view point and the current edge to thereby determine a point on the input edge at which visibility changes, repeating the above steps with respect to all of the intersections between contour edges and the input edge to determine all of the crossing points defining segments, and then sorting the crossing points to define the segments.

4. A method as claimed in claim 2 wherein the object face edge line segments are checked for visibility by finding the point at which a line from the view point to the midpoint of the edge segment pierces the plane of each visible face, and then determining whether the last mentioned pierce point is closer to the view point than to the edge segment midpoint.

5. A method as claimed in claim 2 wherein adjacent visible edge line segments of the same line are combined and treated as a single visible edge line segment and wherein adjacent visible edge line segments of the same line are combined and treated as a single invisible edge line segment for further processing.

6. A method as claimed in claim 2 wherein the change in the number of component objects consists of adding at least one new object and wherein the method includes comparisons of edgeline segments with visible faces comprising the steps of comparing each edge line segment of the new objects with all visible faces of the new objects to determine which are visible, then comparing all visible edge line segments of the old objects with visible faces of the new objects to determine which become invisible because of the insertion of the new objects and comparing all visible edge line segments of the new objects with the visible faces of the old objects to determine which become invisible.

7. A method as claimed in claim 2 wherein the number of component objects is changed by removing at least one object and wherein only the invisible edge line segments of the remaining objects are checked against remaining visible faces to determine which will become visible.

8. A method as claimed in claim 7 wherein the remaining invisible edge line segments are checked against remaining visible faces only within a two-dimensional projection outline of the removed object.

9. A method as claimed in claim 3 wherein the change in the number of component objects consists of adding at least one new object and wherein the method includes comparisons of edge line segments with visible faces comprising the steps of comparing each edge line segment of the new objects with all visible faces of the new objects to determine which are visible, then comparing all visible edge line segments of the old objects with visible faces of the new objects to determine which become invisible because of the insertion of the new objects and comparing all visible edge line segments of the new objects with the visible faces of the old objects to determine which become invisible.

10. A method as claimed in claim 3 wherein the object face edge line segments are checked for visibility by finding the point at which a line from the view point to the midpoint of the edge segment pierces the plane of each visible face, and then determining whether the last mentioned pierce point is closer to the view point than to the edge segment midpoint.

11. A method as claimed in claim 4 wherein adjacent visible edge line segments of the same line are combined and treated as a single visible edge line segment and wherein adjacent invisible edge line segments of the same line are combined and treated as a single invisible edge line segment for further processing.

12. A method as claimed in claim 4 wherein the number of component objects is changed by removing at least one object and wherein only the invisible edge line segments of the remaining objects are checked against remaining visible faces to determine which will become visible.

13. A method as claimed in claim 4 wherein the change in the number of component objects consists of adding at least one new object and wherein the method includes comparisons of edge line segments with visible faces comprising the steps of comparing each edge line segment of the new objects with all visible faces of the new objects to determine which are visible, then comparing all visible edge line segments of the old objects with visible faces of the new objects to determine which become invisible because of the insertion of the new objects and comparing all visible edge line segments of the new objects with the visible faces of the old objects to determine which become invisible.

14. A method as claimed in claim 5 wherein the number of component objects is changed by removing at least one object and wherein only the invisible edge line segments of the remaining objects are checked against remaining visible faces to determine which will become visible.

15. A method as claimed in claim 5 wherein the change in the number of component objects consists of adding at least one new object and wherein the method includes comparisions of edge line segments with visible faces comprising the steps of comparing each edge line segment of the new objects with all visible faces of the new objects to determine which are visible, then comparing all visible edge line segments of the old objects with visible faces of the new objects to determine which become invisible because of the insertion of the new objects and comparing all visible edge line segments of the new objects with the visible faces of the old objects to determine which become invisible.

* * * * *